United States Patent [19]
Keil

[11] Patent Number: 4,537,677
[45] Date of Patent: Aug. 27, 1985

[54] OIL EMULSIONS OF FLUOROSILICONE FLUIDS

[75] Inventor: Joseph W. Keil, Midland, Mich.

[73] Assignee: Dow Corning Corporation, Midland, Mich.

[21] Appl. No.: 668,048

[22] Filed: Nov. 5, 1984

[51] Int. Cl.$^3$ .................. C10M 1/18; C10M 1/28; C10M 1/30

[52] U.S. Cl. .................. 208/370; 252/49.6; 252/358; 585/10

[58] Field of Search .......... 208/370, 348; 252/49.6, 252/358; 203/20; 585/10, 7

[56] References Cited

U.S. PATENT DOCUMENTS

| | | | |
|---|---|---|---|
| 2,862,885 | 12/1958 | Nelson et al. | 252/49.6 |
| 3,355,474 | 11/1967 | Wheeler, Jr. | 252/358 |
| 3,384,600 | 5/1968 | Domba | 252/49.6 |
| 3,642,626 | 2/1972 | Christian | 252/49.6 X |
| 3,647,740 | 3/1972 | Loree et al. | 252/49.6 X |
| 3,663,649 | 5/1972 | Wheeler, Jr. | 252/49.6 |
| 3,951,832 | 4/1976 | McCoy | 252/49.6 |
| 4,082,690 | 4/1978 | Farminer | 252/358 X |
| 4,115,343 | 9/1978 | Guillaume et al. | 252/49.6 X |
| 4,329,528 | 5/1982 | Evans | 208/370 X |
| 4,395,352 | 7/1983 | Kulkarni et al. | 252/358 X |

Primary Examiner—D. E. Gantz
Assistant Examiner—Glenn A. Caldarola
Attorney, Agent, or Firm—George A. Grindahl

[57] ABSTRACT

Emulsions of fluorosilicone fluids in mineral oil are disclosed. These emulsions are stabilized by a polydimethylsiloxane- polybutadiene copolymer or a polydimethylsiloxane-hydrogenated polybutadiene copolymer. The emulsions are an effective foam suppressant for organic liquids, especially crude petroleum.

27 Claims, No Drawings

OIL EMULSIONS OF FLUOROSILICONE FLUIDS

BACKGROUND OF THE INVENTION

The present invention relates to emulsions of fluorosilicone fluids in mineral oil, and to the use of these emulsions to suppress foam in organic liquids.

Silicones have long been recognized as foam suppressants. Methyl-substituted silicones are used extensively to suppress foam in aqueous media. Unfortunately, the methyl-substituted silicones are completely soluble in many organic liquids and therefore do not suppress foam in these liquids. In fact, methyl-substituted silicones sometimes even promote foam formation in organic liquids.

Currie, in U.S. Pat. No. 3,115,472, issued Dec. 24, 1963, disclosed, as an antifoam for organic solvents, solutions of perfluoroalkyl-substituted silicones in perchloroethylene or methyl-ethyl ketone. The presence of perfluoroalkyl substituents apparently changed the solubility characteristics sufficiently that foam suppression could be achieved in some organic liquids.

Michalski, in U.S. Pat. No. 3,660,305, issued May 2, 1972, disclosed a method of dispersing silicones such as perfluoroalkyl-substituted silicones. Michalski dispersed the silicone in an acetylenic alcohol.

Unfortunately, dispersions of perfluoro- alkyl-substituted silicones in polar solvents, such as methyl ethyl ketone, perchloroethylene and acetylenic alcohols, lose their efficacy as foam suppressants with time. This loss of efficacy is thought to be caused by depolymerization catalyzed by traces of acidic substances, said depolymerization being promoted by polar solvents.

Evans, in U.S. Pat. No. 4,329,528, issued May 11, 1982, disclosed a copolymer consisting of some dialkyl-substituted siloxy groups and some fluorinated alkyl-substituted siloxy groups. This copolymer apparently has the advantage of being at least partially soluble in some non-polar hydrocarbons. The copolymers, therefore, are more readily dispersible in organic liquids.

While each of the above references deals with the problem of dispersing fluorosilicone fluids so that they can be readily used to suppress foam in organic liquids, there is still a need to provide a simple and effective way of dispersing fluorosilicone fluids.

The present invention deals with novel emulsions of fluorosilicone fluids in mineral oil. The emulsion is stabilized by a particular polydimethylsiloxane-polybutadiene or polydimethylsiloxane-hydrogenated polybutadiene copolymer.

The term foam suppressant is to be understood in this specification to encompass the terms antifoaming agent and defoaming agent. Antifoaming is the prevention of foam in whole or in part. Defoaming is diminishing or eliminating an already existing foam.

SUMMARY OF THE INVENTION

It is an object of the present invention to provide stable emulsions of fluorosilicone fluids in mineral oil. It is a further object to use this stable emulsion to suppress foam in organic liquids. It is another object to provide an effective means of supplying a fluorosilicone fluid foam suppressant at low concentrations to a foaming organic liquid. It is another object to suppress foam in crude petroleum.

These objects and others are attained by the emulsions of the present invention and their use. The emulsions of the present invention comprise:
(A) a fluorosilicone fluid;
(B) a certain block copolymer; and
(C) mineral oil.

DETAILED DESCRIPTION

The present invention deals with an emulsion comprising, in combination:

(A) from 0.5 to 90 parts by weight of a fluorosilicone fluid having the average formula

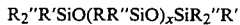

wherein:

R is a fluoroalkyl radical having the general formula $(C_mF_{2m+1})(CH_2CH_2)_y$, m having an average value of 1, 2, 3, or 4, y having a value of 1, 2, or 3, wherein in said average formula for the fluorosilicone fluid x has a value of from 5 to 100, R" is a monovalent hydrocarbon radical, and R' is selected from the group consisting of OH radicals R" radicals, and R radicals;

(B) from 0.1 to 25 parts by weight of a block copolymer selected from the group consisting of polydimethylsiloxane-polybutadiene block copolymers and polydimethylsiloxane-polybutadiene block copolymers in which the polybutadiene block has been wholly or partially hydrogenated; and (C) from 9 to 89 parts by weight of mineral oil.

Component (A) of the emulsions of the present invention is a fluorosilicone fluid having the average formula

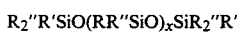

wherein:

R is a fluoroalkyl radical;

R" is a monovalent hydrocarbon radical;

R' is selected from R, R" and OH radicals; and x has a value of from 5 to 100.

The fluoroalkyl radical in the above formula, R, has the general formula

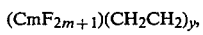

wherein:

m has an average value of 1, 2, 3, or 4; and y has an average value of 1, 2, or 3.

Examples of suitable fluoroalkyl radicals include $CF_3CH_2CH_2-$, $CF_3CF_2CH_2CH_2$, $CF_3CF(CF_3)CH_2CH_2$, and similar structures. The $CF_3CH_2CH_2-$ radical is preferred for the fluorosilicones used in the emulsions of the present invention.

The value of x in the above average formula for the fluorosilicone fluids is from 5 to 100. Thus, the fluorosilicone fluids can range from a fluid having a viscosity of about 100 centistokes at 25° C. to a fluid having a viscosity of about 15,000 centistokes at 25° C.

R" in the average formula for the fluorosilicone fluids is a monovalent hydrocarbon radical, that is, a monovalent radical composed of hydrogen atoms and carbon atoms. R" can thus be an alkyl radical, such as methyl, ethyl, butyl, propyl and the like; an alkenyl or cycloalkenyl radical, such as vinyl, allyl, cyclopentenyl and the like; an aryl radical, such as phenyl, tolyl, xylyl and the like; an arylalkyl radical, such as betaphenylethyl, beta-phenylpropyl and the like; or a cycloaliphatic radical, such as cyclohexyl, cyclopentyl, cycloheptyl and the like. Preferably R" is a lower alkyl radical, such as methyl, ethyl, or propyl. Most preferably, R" is a methyl radical.

R' in the average formula for the fluorosilicone fluids is selected from the group consisting of R radicals as defined above, R" radicals as defined above, and hydroxyl radicals.

While the average formula above indicates a linear polymer, minor amounts of branching, i.e. $RSiO_{1.5}$ units or $R'SiO_{1.5}$ units, in the fluorosilicone fluids are not thought to have any significant effect on the emulsions of the present invention. Such branching is sometimes inadvertently introduced in the industrial manufacture of fluorosilicone fluids.

Many fluorosilicone fluids meeting the above description are commercially available. Other fluorosilicone fluids can be made by known methods, such as that method disclosed in U.S. Pat. No. 2,961,425, issued to Pierce and Holbrook Nov. 22, 1960. U.S. Pat. No. 2,961,425 is hereby incorporated herein to teach a method of preparing fluorosilicone fluids for use in the emulsions of the present invention.

Fluorosilicone fluids wherein R is the $CF_3CH_2CH_2$ group and R' is the methyl radical are preferred. These preferred fluorosilicone fluids are commercially available.

The block copolymer, component (B) in the emulsions of the present invention, consists of, on average, at least one block of polydimethylsiloxane covalently bonded through one of its terminal units to a terminal unit of at least one block of polybutadiene or hydrogenated polybutadiene.

Blocks are defined herein as molecular units of homogeneous composition comprising of an integer number of segments, each segment having substantially the molecular weight of the corresponding starting material in the synthesis of the block copolymer, described hereinbelow.

Each polydimethylsiloxane block consists of one or more polydimethylsiloxane segment. The average molecular weight of the polydimethylsiloxane segments is from about 1,000 to about 10,000 and more preferably from about 1,800 to about 3,600. Polydimethylsiloxane blocks are represented herein as A.

Each polybutadiene or hydrogenated polybutadiene block consists of one or more polybutadiene or hydrogenated polybutadiene segment. The average molecular weight of these segments is from about 1,000 to about 8,000 and more preferably from about 1,000 to about 4,000. Polybutadiene or hydrogenated polybutadiene blocks are represented herein as B.

Possible block configurations for the block copolymers used in the emulsions of the present invention include $(AB)_n$, $(BAB)_n$, and $(ABA)_n$, wherein n is an integer. Illustrative, but not limiting, are the following possible block configurations: AB; ABAB; ABA; ABABA; BAB; BABAB; ABABABA; and the like.

The specific arrangement of the blocks within the copolymer is not thought to be critical, so long as, on average, at least one polydimethylsiloxane block is convalently bonded to at least one polybutadiene or hydrogenated polybutadiene block.

The block copolymers used as component (B) in the emulsions of the present invention contain an amount of polydimethylsiloxane segments from about 5% to about 50% by weight, and more preferably from about 10% to about 40% by weight. Said copolymers contain an amount of polybutadiene or hydrogenated polybutadiene segments from about 50% to about 95% by weight, and more preferably from about 60% to about 90% by weight.

Small amounts, such as 5% or 10% by weight, of polybutadiene, hydrogenated polybutadiene, or polydimethylsiloxane homopolymer, are not thought to affect the utility of the emulsions of the present invention in any significant way.

While the block copolymers used in the emulsions of the present invention can be made by several suitable copolymerization techniques, such as sequential anionic polymerization of the appropriate monomers, the best method of preparing said block copolymers that is known at the present time is co-condensation of polydimethylsiloxane segments with polybutadiene or hydrogenated polybutadiene segments through mutually coreactive end groups.

For example, hydroxy-endblocked polybutadiene segments, or hydroxy-endblocked polybutadiene segments that have been hydrogenated, can be co-condensed with polydimethylsiloxane segments having silicon-bonded hydrolyzable radicals at one or both terminal ends of said polydimethylsiloxane segments.

Suitable hydroxy-endblocked polybutadiene segments are commercially available, and can be obtained, for instance, from the Arco Chemical Company of Philadelphia, PA. Suitable hydrogenated hydroxy-endblocked polybutadiene segments are commercially available, and can be obtained from Nissholwai American Corp. of New York, N.Y. Alternatively, hydroxy-endblocked polybutadiene segments can be prepared by such methods as anionic polymerization of butadiene with a bifunctional initiator, followed by termination of the polymerization with ethylene oxide, and subsequent hydrolysis of the terminal ends, to produce hydroxy-endblocked polybutadiene segments. Said polybutadiene segments can then be wholly, substantially, or partially hydrogenated by well known method to remove residual unsaturation, if desired. By hydrogenated it is meant herein wholly, substantially, or partially hydrogenated.

Polydimethylsiloxane segments containing silicon-bonded hydrolyzable end groups are well known in the organosilicon art. Examples of suitable silicone-bonded hydrolyzable end groups include hydroxy groups; alkoxy groups, such as methoxy, ethoxy, or isopropoxy; halo groups, such as fluoro, chloro, or bromo; amido groups, such as N-methylacetamido; oximo, such as methylketoximo; aminoxy groups such as diethylaminoxy; acyloxy groups, such as acetoxy, propionoxy, benzoxy; and the like.

The polydimethylsiloxane segments, and the polybutadiene or hydrogenated polybutadiene segments, with mutually coreactive end groups, can be co-condensed by direct reaction with one another, or said segments can be co-condensed by means of an appropriate coupling agent. Silanes bearing two silicon-bonded hydrolyzable groups as hereinabove defined are appropriate coupling agents.

After co-condensing the above segments with mutually coreactive end groups, any co-condensation by-products can be removed by separation means, such as distillation. If the co-condensation byproduct has no substantially deleterious effect in a subsequently prepared emulsion of the present invention, it can be simply left in the block copolymer.

A convenient method of synthesis for the block copolymers used in the emulsions of the present invention is co-condensation of hydroxy-endblocked polydimethylsiloxane segments or hydrogenated hydroxy-endblocked polybutadiene segments.

Co-condensation of the above dihydroxy-ended polymers is preferably conducted in a solvent, such as an aromatic hydrocarbon solvent, such as benzene, toluene, or xylene; or an aliphatic hydrocarbon solvent, such as pentane, hexane or heptane. While the relative amount of solvent used is not narrowly critical, from 10 to 50 parts by weight of the polymeric starting materials and 50 to 90 parts by weight of solvent, are appropriate, said parts being based upon 100 total parts for said materials plus said solvent.

Said solvent can be removed from the block copolymer produced in the co-condensation reaction by separation means, such as distillation. Advantageously, said solvent and any co-condensation byproduct, can be removed from the block copolymer simultaneously by distillation.

In a preferred method for synthesizing the block copolymer, the reaction is conducted in toluene, the solution of copolymer and toluene is further diluted with mineral oil, and the toluene is distilled from the resulting mixture of copolymer, toluene, and mineral oil.

The co-condensation reaction can be catalyzed by effective amounts of a condensation catalyst. Appropriate catalysts include the polydimethylsiloxane-soluble salts of Pb, Fe, Co, Zr, Ti, Mn, and Sn, such as stannous octoate, dibutyltindilaurate and the like, amines, and weak organic acids and their alkali metal salts, such as the sodium and potassium salts of acetic acid.

Suitable methods of analyzing and characterizing the block copolymers used in the composition of the present invention include: molecular weight determination by gel permeation chromatography of said copolymer and comparison of the resultant chromatogram with the chromatograms of known standards; identification of chemical groups present by methods well known in nuclear magnetic resonance spectroscopy and infrared spectroscopy; elemental analysis and other well known analytical techniques.

The molecular weight of the block copolymer is not critical, and can range from a minimum of about 2,000, up to 80,000 and more.

Component (C) of the emulsions of the present invention is a mineral oil. By mineral oil it is meant herein oils manufactured from the distillate fraction of crude petroleum. Mineral oils are complex mixtures of hydrocarbons and other organic compounds, and cannot be defined precisely. Mineral oils, however, can be characterized, and are very well known.

In general, mineral oils have specific gravity values in the range of 0.85 to 0.88; they have pour points from about $-30°$ F. to $10°$ F.; the have closed cup flash points of from about $350°$ F. to about $500°$ F.; they have refractive indices from about 1.465 to about 1.478; and they have number average molecular weights of 300 to 500 or so.

Mineral oils are also characterized as paraffinic or naphthenic. Paraffinic mineral oils are characterized by having relatively higher amounts of paraffinic, i.e. alkane and alkene groups. Naphthenic mineral oils are characterized by having relatively higher amounts of naphthenic, i.e. cyclic aromatic, groups.

By way of example, a typical naphthenic mineral oil can have 35 to 45% of the carbon atoms in the oil present in cyclic aromatic groups, and the balance of carbon atoms present in the alkane and alkene groups. A typical paraffinic mineral oil, on the other hand, can have 20% to 30% of the carbon atoms in the oil present in cyclic aromatic groups and the balance of carbon atoms present in alkane and alkene groups.

While the choice of mineral oil for use as component (C) of the emulsions of the present invention is not critical, the use of a paraffinic mineral oil is preferred.

Mineral oils are available commercially from many sources, and need not be further dealt with herein.

The emulsions of the present invention comprise:
0.5 to 90 parts by weight of component (A);
0.1 to 25 parts by weight of component (B); and
9 to 89 parts by weight of component (C).

More preferably, the emulsions of the present invention comprise:
20 to 80 parts by weight of component (A);
2 to 20 parts by weight of component (B); and
12 to 80 parts by weight of component (C).

Most preferably, the emulsions of the present invention comprise:
30 to 50 parts by weight of component (A);
8 to 16 parts by weight of component (B); and
20 to 60 parts by weight of component (C).

The emulsions of the present invention are made by mixing the appropriate amounts of components (A), (B), and (C) under shearing conditions of sufficient intensity to reduce the particle size of the fluorosilicone fluids to less than 5 microns in diameter. More preferably, conditions are sufficient to reduce the particle size to from 0.5 to 1.0 microns in diameter.

Equipment suitable for such mixing is well known and widely available. For example, Eppenbach mixers, colloid mills, homogenizers, and Sonolator® emulsifiers are suitable.

The emulsions of the present invention are used to suppress foam in organic liquids by adding said emulsions to said liquids. Therefore, the present invention further relates to a method for suppressing foam in an organic liquid, said method comprising adding to said liquid from 0.1 to 200 parts per million by weight, based on the total weight of the liquid, of an emulsion comprising, in combination:

(A) from 0.5 to 90 parts by weight of a fluorosilicone fluid having the average formula

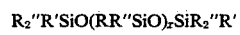

wherein:
R is a fluoroalkyl radical having the general formula $(C_mF_{2m+1})(CH_2CH_2)_y$,
m having an average value of 1, 2, 3, or 4,
y having a value of 1, 2, or 3,
wherein in said average formula for the fluorosilicone fluid, x has a value of from 5 to 100, R″ is a monovalent hydrocarbon radical, and R″ is selected from the group consisting of OH radicals, R″ radicals, and R radicals, (B) from 0.1 to 25 parts by weight of a block copolymer selected from the group consisting of polydimethylsiloxane-polybutadiene block copolymers and polydimethylsiloxane-polybutadiene block copolymers in which the polybutadiene block has been wholly or partially hydrogenated; and (C) from 9 to 89 parts by weight of mineral oil.

The emulsions of the present invention can be added to the organic liquid by any reasonable means. For example, the emulsions of the present invention can be added manually, by eyedropper or syringe, or they can be added automatically via metering pump. It is especially contemplated that the emulsions of the present invention be added continuously to a continuous stream of organic liquid. The emulsion of the present invention in this case is added at a composition of the present invention/organic liquid ratio of from 0.1 to 1,000,000 to 200 to 1,000,000.

While the emulsions of the present invention provide useful foam suppressants for nonpolar organic liquids, their utility in suppressing foam in crude petroleum is especially important. Thus the emulsions of the present invention can be advantageously used in petroleum processing operations both at the wellhead and at the refinery. Examples of such processes are degassing, scrubbing, liquifiable natural gas reinjection and other processes.

Petroleum stocks differ very significantly depending upon their source. The emulsions of the present invention have been found to be particularly effective foam suppressants for North Sea crude, such as Mobil 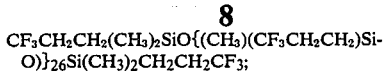 Statfjord B.

The following Examples are presented to further teach how to make and use the emulsions of the present invention. Parts and percentages in the Examples are by weight unless otherwise specified.

The term ppm in the Examples means parts by weight of emulsion per million parts of the total weight of the liquid.

EXAMPLE 1

1. Synthesis of block copolymer Component (B)

The following ingredients were added to a 1000 ml flask fitted with an airmotor-driven stirrer:

25.0 g of an hydroxy-endblocked polydimethylsiloxane having a viscosity of 65 centistokes at 25° C. and a molecular weight of about 2,800;

75.0 g of Nisso PB-G1 3000, an hydroxy endblocked hydrogenated polybutadiene having a molecular weight of approximately 3000. This polymer was obtained from Nissho Iwai Americam Corp. New York, N.Y.; and 73.5 g of xylene.

These three components were mixed and heated until the xylene had refluxed for 30 minutes. A portion of the refluxing vapors were diverted and condensed, thus removing traces of water.

The mixture of three components was then allowed to cool to a temperature of 70° C., after which 6.0 g of $(CH_3)(CH_2=CH)Si(N(CH_3)COCH_3)_2$ were added. There followed an exothermic reaction.

To the above reaction mixture was added 200 g of Security 39, a paraffinic mineral oil sold by the Gulf Oil Co. of Pittsburgh, PA.

The resulting mixture was then heated and xylene vapors were diverted, condensed, and discarded until substantially all the xylene had been removed. The resulting mixture consisted essentially of 67% mineral oil and 33% block copolymer.

2. Preparation of the Emulsion

The following ingredients were combined in an Eppenbach mixer for approximately one minute:

(A) 40 parts of a fluorosilicone fluid having the approximate formula $CF_3CH_2CH_2(CH_3)_2SiO\{(CH_3)(CF_3CH_2CH_2)SiO\}_{26}Si(CH_3)_2CH_2CH_2CF_3$;

(B) 12 parts of the block copolymer prepared as above described; and (C) 48 parts of Shellflex 412 process oil, a paraffinic mineral oil sold by the Shell Oil Co. of Houston Tex.

Microscopic examination of the resulting emulsion showed a fluorosilicone fluids particle size of about 0.5 microns.

3. Test Results

The emulsion of this example was tested by adding 1, 2, and 4 parts per million respectively, of the emulsion, to a test foam mixture consisting of #2 diesel fuel containing 0.5% of a profoamer consisting primarily of a polyalkyleneoxide polymethyldodecylsiloxane copolymer.

In each test, a fresh, clean bottle was approximately half-filled with test foam mixture and added foam suppressant. Each bottle was then shaken for 10 seconds on a Burrell ®Shaker, a product of the Burrell Corporation of Pittsburgh, Pa. The foam height after shaking had been completed was measured, and was recorded as a percentage of the liquid height. The time in seconds for the foam to dissipate sufficiently that a clear liquid surface was observed was also measured and recorded.

Results of this testing are found in Table 1.

The above-described foam test was also conducted on a composition of the prior art. This comparison composition consisted of a 1% solution of the fluorosilicone fluid of Example 1 dissolved in methyl ethyl ketone. The results of this testing are also found in Table 1.

Note the superior results found with the emulsions of the present invention compared to the composition of the prior art.

TABLE 1

| | Foam Suppressing Test Results antifoam level | | | | | |
|---|---|---|---|---|---|---|
| | 1 ppm | | 2 ppm | | 4 ppm | |
| | foam height | clear surface | foam height | clear surface | foam height | clear surface |
| Example 1 | 5% | 4 sec | trace | 3 sec | trace | 1 sec |
| Composition of Prior Art | 12% | 20 sec | 15% | 19 sec | 10% | 15 sec |

EXAMPLE 2

An emulsion of the present invention was prepared as generally described in Example 1, with a fluorosilicone fluid having the average formula $CF_3CH_2CH_2(CH_3)_2SiO\{(CH_3)(CF_3CH_2CH_2)SiO\}_{8-7}Si(CH_3)_2CH_2CH_2CF_3$ This emulsion was diluted with mineral oil, and tested in a sparge test. In the sparge test, nitrogen was blown at a rate of 50 ml/minute, through a porous polyvinylchloride membrane into Mobil 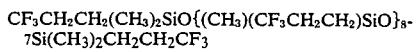 Statfjord B crude oil and 20% hexane. Foam produced in the sparge test was monitored.

Varying amounts of the diluted emulsion were added to the fluid, and the amount of foam above the liquid level was determined after 1 minute, and was expressed in ml of foam. 100 ml of foam is considered a failure. See Table 2 for results.

TABLE 2

| Foam Suppression in Crude Oil | |
|---|---|
| Amount of Emulsion | Foam After One Minute |
| 0 | 100 ml |
| 5 ppm | 65 ml |
| 10 ppm | 65 ml |
| 21 ppm | 45 ml |

That which is claimed is:

1. An emulsion comprising, in combination:
   (A) from 0.5 to 90 parts by weight of a fluorosilicone fluid having the average formula $$R_2''R'SiO(RR''SiO)_xSiR_2''R'$$

wherein
   R is a fluoroalkyl radical having the general formula $$(C_mF_{2m+1})(CH_2CH_2)_y,$$

m having an average value of 1, 2, 3, or 4,
   y having a value of 1, 2, or 3,
   wherein in said average formula for the fluorosilicone fluid
   x has a value of from 5 to 100,
   R'' is a monovalent hydrocarbon radical, and
   R' is selected from the group consisting of OH radicals, R'' radicals, and R radicals,
   (B) from 0.1 to 25 parts by weight of a block copolymer selected from the group consisting of polydimethylsiloxane-polybutadiene block copolymers and polydimethylsiloxane-polybutadiene block copolymers in which the polybutadiene block has been wholly or partially hydrogenated; and
   (C) from 9 to 89 parts by weight of mineral oil.

2. An emulsion as claimed in claim 1 wherein R is the $CF_3CH_2CH_2$- radical and R'' is the $CH_3$- radical.

3. An emulsion as claimed in claim 2 wherein the fluorosilicone fluid is dispersed in particles having an average diameter of from 0.5 microns to 1.0 microns.

4. An emulsion as claimed in claim 1 comprising
   20 to 80 parts by weight of Component (A);
   2 to 20 parts by weight of Component (B); and
   12 to 80 parts by weight of Component (C).

5. An emulsion as claimed in claim 4 wherein R is the $CF_3CH_2CH_2$- radical and R'' is the —$CH_3$ radical.

6. An emulsion as claimed in claim 5 wherein the fluorosilicone fluid is dispersed in particles having an average diameter of from 0.5 microns to 1.0 microns.

7. An emulsion as claimed in claim 4 comprising
   30 to 50 parts by weight of Component (A);
   8 to 16 parts by weight of Component (B);
   20 to 60 parts by weight of Component (C).

8. An emulsion as claimed in claim 7 wherein R is the $CF_3CH_2CH_2$- radical and R'' is the $CH_3$ radical.

9. An emulsion as claimed in claim 8 wherein the fluorosilicone fluid is dispersed in particles having an average diameter of from 0.5 microns to 1.0 microns.

10. A method for suppressing foam in an organic liquid, said method comprising adding to said liquid from 0.1 to 200 parts per million by weight, based on the total weight of the liquid, of an emulsion comprising, in combination:
    (A) from 0.5 to 90 parts by weight of a fluorosilicone fluid having the average formula $$R_2''R'SiO(RR''SiO)_xSiR_2''R'$$

wherein R is fluoroalkyl radical having the general formula $$(C_mF_{2m+1})(CH_2CH_2)_y,$$

m having an average value of 1, 2, 3, or 4 and y having a value of 1, 2, or 3,
    wherein in said average formula for the fluorosilicone fluid
    x has a value of from 5 to 100,
    R'' is a monovalent hydrocarbon radical, and
    R' is selected from the group consisting of OH radicals, R'' radicals, and R radicals.
    (B) from 0.1 to 25 parts by weight of a block copolymer selected from the group consisting of polydimethylsiloxane-polybutadiene block copolymers and polydimethylsiloxane-polybutadiene block copolymers in which the polybutadiene block has been wholly or partially hydrogenated; and
    (C) from 9 to 89 parts by weight of mineral oil.

11. A method as claimed in claim 10 wherein R is the $CF_3CH_2CH_2$- radical and R'' is the $CH_3$- radical.

12. A method as claimed in claim 4 wherein the fluorosilicone fluid is dispersed in particles having an average diameter of from 0.5 microns to 1.0 microns.

13. A method as claimed in claim 10 comprising
    20 to 80 parts by weight of Component (A);
    2 to 20 parts by weight of Component (B); and
    12 to 80 parts by weight of Component (C).

14. A method as claimed in claim 13 wherein R is the $CF_3CH_2CH_2$- radical and R'' is the —$CH_3$ radical.

15. A method as claimed in claim 14 wherein the fluorosilicone fluid is dispersed in particles having an average diameter of from 0.5 microns to 1.0 microns.

16. A method as claimed in claim 13 comprising
    30 to 50 parts by weight of Component (A);
    8 to 16 parts by weight of Component (B); and
    20 to 60 parts by weight of Component (C).

17. A method as claimed in claim 16 wherein R is the $CF_3CH_2CH_2$- radical and R'' is the $CH_3$- radical.

18. A method as claimed in claim 17 wherein the fluorosilicone fluid is dispersed in particles having an average diameter of from 0.5 microns to 1.0 microns.

19. A method as claimed in claim 10 wherein the organic liquid is crude petroleum.

20. A method as claimed in claim 11 wherein the organic liquid is crude petroleum.

21. A method as claimed in claim 12 wherein the organic liquid is crude petroleum.

22. A method as claimed in claim 13 wherein the organic liquid is crude petroleum.

23. A method as claimed in claim 14 wherein the organic liquid is crude petroleum.

24. A method as claimed in claim 15 wherein the organic liquid is crude petroleum.

25. A method as claimed in claim 16 wherein the organic liquid is crude petroleum.

26. A method as claimed in claim 17 wherein the organic liquid is crude petroleum.

27. A method as claimed in claim 18 wherein the organic liquid is crude petroleum.

* * * * *